(12) United States Patent
Taylor (10) Patent No.: US 10,442,492 B2
(45) Date of Patent: Oct. 15, 2019

(54) ARTICULATING, LOCKING BICYCLE STEM (71) Applicant: Timothy K Taylor, Victoria (CA)

(72) Inventor: Timothy K Taylor, Victoria (CA)

( * ) Notice: Subject to any disclaimer, the term of this patent is extended or adjusted under 35 U.S.C. 154(b) by 0 days.

(21) Appl. No.: 15/757,635

(22) PCT Filed: Dec. 16, 2016

(86) PCT No.: PCT/CA2016/051493
§ 371 (c)(1),
(2) Date: Mar. 5, 2018

(87) PCT Pub. No.: WO2017/106967
PCT Pub. Date: Jun. 29, 2017

(65) Prior Publication Data
US 2019/0023348 A1    Jan. 24, 2019

(30) Foreign Application Priority Data

Dec. 23, 2015 (CA) ........................... 2916268

(51) Int. Cl.
*B62K 21/16* (2006.01)
*B62K 21/22* (2006.01)
*B62K 15/00* (2006.01)

(52) U.S. Cl.
CPC .............. *B62K 21/16* (2013.01); *B62K 15/00* (2013.01); *B62K 21/22* (2013.01)

(58) Field of Classification Search
CPC ........ B62K 3/02; B62K 15/00; B62K 15/006; B62K 21/00; B62K 21/12; B62K 21/16; B62K 21/18; B62K 21/22; B62K 21/24; B62K 2206/00

USPC .......................................................... 74/551.3
See application file for complete search history.

(56) References Cited

U.S. PATENT DOCUMENTS

| 5,222,751 | A | 6/1993 | Chen |
| 5,887,490 | A | 3/1999 | Dittmar |
| 6,623,023 | B2 | 9/2003 | Niitsu et al. |
| 6,880,848 | B2 | 4/2005 | Liu |
| 7,296,813 | B2 * | 11/2007 | Montague .............. B62K 15/00 280/276 |
| 8,550,484 | B1 | 10/2013 | Draper |

(Continued)

FOREIGN PATENT DOCUMENTS

| CN | 202923815 | 5/2013 |
| CN | 203601504 | 5/2014 |

(Continued)

*Primary Examiner* — Prasad V Gokhale (57) ABSTRACT

An articulating bicycle stem is disclosed herein wherein the stem comprising a handlebar-receiving region, a rotatable member receiving region, a rotatable inner member connected to the handlebar receiving member and received in an outer casing of the rotatable member receiving region. A stem body intervenes the rotatable member receiving region and a steering tube connector. The rotatable member receiving region may include a first releasable locking mechanism for selectively securing the rotatable inner member and inhibiting rotation of the rotatable inner member relative to the outer casing, and thus the handlebars, in at least one of a storage position or a riding position. A method of reducing the footprint of a bicycle is also provided and a kit of part therefor is also provided.

22 Claims, 7 Drawing Sheets

(56) References Cited

U.S. PATENT DOCUMENTS

| | | | |
|---|---|---|---|
| 2003/0052470 A1* | 3/2003 | Lee | B62K 21/16 |
| | | | 280/281.1 |
| 2006/0076752 A1* | 4/2006 | Montague | B62K 15/00 |
| | | | 280/279 |
| 2006/0096408 A1 | 5/2006 | Liao | |
| 2012/0125145 A1* | 5/2012 | VanderVeen | B62H 5/04 |
| | | | 74/551.8 |
| 2013/0319169 A1 | 12/2013 | Savard | |
| 2015/0050073 A1* | 2/2015 | Forgrave | B62K 15/00 |
| | | | 403/188 |
| 2019/0009856 A1* | 1/2019 | Chong | B62K 21/16 |

FOREIGN PATENT DOCUMENTS

| | | |
|---|---|---|
| GB | 2487584 | 8/2012 |
| JP | H1120759 | 1/1999 |
| WO | 2007023314 | 3/2007 |
| WO | 2007148202 | 12/2007 |

* cited by examiner

ARTICULATING, LOCKING BICYCLE STEM

RELATED APPLICATION

The present application is an International Patent Application which claims priority to Canadian Patent Application, 2,916,268, entitled "ARTICULATING, LOCKING BICYCLE STEM", filed Dec. 23, 2015, the subject of matter of which is herein incorporated by reference.

TECHNICAL FIELD

The present technology is directed to a bicycle stem that allows the handlebars to be easily positioned in a coplanar position relative to the bicycle, including the body of the stem and bicycle front wheel. More specifically, the bicycle stem may be securable in at least two positions, the first being the riding position and the second being the storing and maneuvering position.

BACKGROUND

There are a number of situations when it may be desirable to reduce the footprint of a bicycle, or bike. These include when maneuvering or storing their bike in an apartment, condominium, house or garage, when placing them in bike racks and when pushing their bike on sidewalks. There have been a number of approaches to allow cyclists to reduce the footprint of their bicycle, including folding bicycles.

U.S. Pat. No. 6,880,848, issued Apr. 19, 2005 to Lui and entitled "FOLDABLE BICYCLE", discloses a folding bicycle. The foldable bicycle has a frame, a front fork, a front wheel, a stem, a handlebar, a handlebar positioning device, a seat post, a seat, a rear fork, a rear wheel, a drive assembly, a shock absorber and a rear fork positioning device. The handlebar positioning device is mounted between the front fork and the stem such that the stem can be folded toward the frame. The rear fork positioning device is mounted between the shock absorber and the rear fork so that the rear fork can be folded toward the frame. Accordingly, the bicycle can be folded so as to reduce the overall perimeter dimensions of the bicycle for storing or transporting the bicycle.

The handlebar positioning device comprises a bracket, a locking pin, a locking neck and a handlebar quick-release device. The bracket is attached to the top of the front fork and holds the front fork in the head tube. A front longitudinal protrusion and a rear longitudinal protrusion are also provided, where the front longitudinal protrusion has a longitudinal slot and two wings. The wings are formed on opposite sides of the longitudinal slot and extend away from the frame. The locking pin is mounted in the longitudinal slot between the wings and is capable of providing a clamping force to release or maintain the handle bar stem in a folded or in use configuration relative to the bicycle frame.

U.S. Pat. No. 6,623,023, issued Sep. 23, 2003 to Niitsu et al. and entitled "BICYCLE AND BICYCLE FOLDING METHOD", discloses a bicycle and a bicycle folding method, which allow a rider to easily and securely fold and unfold the bicycle. The bicycle has a front wheel and a rear wheel; a saddle on which a rider rides; a pair of pedals to which the rider imparts a drive force; a first frame for holding the front wheel in a rotative manner; a handle for changing the direction of the front wheel; a second frame for holding the rear wheel in a rotative manner; and a linking portion for linking a linking member of the first frame with a linking member of the second frame, wherein the first frame and the second frame may be brought close to each other by the rider's lifting the linking portion with the front wheel and the rear wheel kept in contact with the ground, thereby folding-up the bicycle with the front wheel and the rear wheel overlapping each other so as to reduce the overall perimeter dimensions of the bicycle.

U.S. Pat. No. 5,222,751, issued Jun. 29, 1993 to Chen and entitled "FOLDABLE BICYCLE FRAME", discloses a foldable bicycle frame that comprises a front triangular portion and a rear triangular portion. The former includes a top tube, a down tube, a head tube and a seat tube while the latter contains a bottom bracket tube, a seat stay, a chain stay and a seat tube. Both front and rear triangular portions are hinged by means of upper and lower coupling pieces arranged to pivot such that the bicycle frame can be so as to reduce the overall perimeter dimensions thereof. Upon being unfolded, both front and rear triangular portions are held securely by virtue of a seat stay which extends beyond the seat tube to be fastened securely to the top tube. In some embodiments, the front and rear triangular portions may be also held securely by way of the seat post being inserted into the connection tube.

U.S. Pat. No. 5,887,490, issued Mar. 30, 1999 to Dittmar and entitled "ADJUSTABLE HANDLEBAR STEM USING A LOCKING PIN SYSTEM", is directed specifically to an apparatus for adjusting the vertical and horizontal position of a handlebar on a bicycle or the like. It has a base member, an upper link, a lower link, and a intermediate member forming a parallelogram type link. A protrusion formed on the lower link extends into and slidably contacts a tracking slot formed in the upper link. A locking means for fixing the upper and lower links has a locking pin disposed in a bore formed in the upper link and extending through one of a plurality of holes formed in the protrusion of the lower link. The locking pin defines a locked position when extending into one of the plurality of holes and an unlocked position when released. The pin is biased in the locked position. A release lever is disposed on the upper link having an operating portion for grasping by a rider and a locking pin portion for engaging the locking pin.

United States Patent Application Publication No. 20130319169, published Dec. 5, 2013 to Savard and entitled "BICYCLE STEM HAVING CONTROLLED RELEASE OF THE STEERABILITY THEREOF", discloses a stem for a bicycle handlebar having controlled release of the steerability thereof, includes a body intended for receiving a stem arm which in turn receives a handlebar, the stem also including a headset, elements for attaching the stem to the fork of a bicycle including a head tube and a locking/unlocking element, wherein the locking/unlocking element includes at least one key placed in a cavity arranged in the headset, a resilient element for returning the at least one key towards the outside of the cavity, holes arranged in the stem body through which the keys pass, a ring suitable for retracting the at least one key through the holes by a rotation or translation movement, respectively. The mounting also provides a headset arrangement. The objective of this technology is to reduce the space needed to store a bike and to protect the bike from theft. The handlebars can be either left loose in relation to the wheel or can be locked in each of the coplanar or perpendicular positions. Only the bicycle stem is rotatable relative the forks of the bicycle, hence the footprint of the bicycle is as wide as the stem is long when the stem is folded for storage.

United States Patent Application Publication No. 20120125145, published May 24, 2012 to VanderVeen and entitled "PIVOTABLE HANDLEBAR FOR LOCKING AND EFFICIENT STORAGE OF A BICYCLE", discloses a pivotable handlebar stem apparatus comprised of a clamp body, a cam lock, and a positioning component. The clamp body fits around a handlebar stem or portion of the handlebars of a bicycle. When the cam lock is unlocked and the positioning component is disengaged, the handlebars may be rotated from a riding position to a parked position for convenient storage, transport and parking. The apparatus is configured to allow the handlebars to swing from a horizontal position to a vertical position in a vertical plane; hence the length of the bicycle remains the same, while the width is reduced.

United States Patent Application Publication No. 20060096408, published May 11, 2006 to Liao and entitled "BICYCLE STEM HAVING A POSITIONING MECHANISM FOR RE-POSITIONING A HANDLE", discloses a bicycle stem having a positioning mechanism for re-positioning a handle that comprises a vertical tube; an adaptor having a bore and an extension, wherein the bore receives therein the vertical tube so that the adaptor can rotate about the vertical tube; a lateral tube with a front end having a clamp for locking the handle, and a rear end pivotally connected to the extension of the adaptor; and a positioning mechanism comprising a rod for fixing the adaptor on the vertical tube as the adaptor is rotated to the required position about the vertical tube. The described mechanism relies on a quick release and a locking rod that is engaged in an aperture when the stem is locked in the riding position. In the storage position, the locking rod is disengaged and the quick release is again closed to hold the stem in the storage position. Accordingly, the stem body is normal to the remainder of the bicycle when the handlebars are in the storage position, hence the footprint of the bicycle is as wide as the stem is long.

European Patent Application No. EP1917179, published May 7, 2008 to Hudson and entitled "A BICYCLE HAVING A FOLDABLE HANDLEBAR STEM", discloses a bicycle having a stem connecting handlebars to a steering column, the stem, when actuated by a lever moves handlebars and holds them in a storage position. The stem has a handle portion and a steering portion. The steering portion is coupled to the front fork such that it extends transverse to the steering axis to a first end to which the handle portion is coupled. The handle portion couples the handlebar to the steering portion. The handle portion of the stem is movable relative to the steering portion between a steering position and a storage position. The lever is coupled to means for actuating the handle portion, said means can comprise a push/pull rod which can be coupled to the lever by an over center mechanism. The handlebars are not retained in a coplanar position with the bicycle frame or the front wheel when in the storage position.

Similarly, U.S. Pat. No. 8,550,484, issued Oct. 8, 2013 to Draper and entitled "ADJUSTABLE BICYCLE HANDLE BAR ADAPTER AND ASSOCIATED METHOD", discloses an adjustable bicycle handle bar adapter and associated method. A bicycle headstock assembly may include a lower member adapted to be attached to a steering rod of the bicycle, and an upper member adjustably connected to the lower member. A pivot joint may be formed at a connection of the lower and upper members respectively. A handle bar clamp may be connected to the upper member and extending away therefrom. A primary fastener may pass through a first location of the pivot joint while an auxiliary fastener may pass through a second location of the pivot joint respectively. In this way, the primary and auxiliary fasteners may cooperate to permit the upper member to selectively pivot and lock at alternate positions relative to the lower member. Furthermore, the handle bar clamp may be rotatable in the upper member such that the handlebars may rotated in a vertical plane for storage, similar to that disclosed in United States Patent Application Publication No. 20120125145, noted above.

This background information is provided to reveal information believed by the applicant to be of possible relevance. No admission is necessarily intended, nor should be construed, that any of the preceding information constitutes prior art.

SUMMARY

The following presents a simplified summary of the general inventive concepts described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

In order to reduce the footprint of bicycles for storage, transport and in situations such as being pushed down a sidewalk or along a hallway, it would be desirable to have a mechanism which permits adjusting the position of the handlebars of a bicycle relative to the front wheel and the remainder of the bicycle where the handlebars may be easily repositioned so as to be co-planar, for example, in line with the bicycle frame and front wheel. Such a mechanism would desirably allow the body of the stem to remain inline, i.e. co-planar, with the bicycle frame and front wheel, while the handlebars are repositioned from a normal, riding position to be coplanar with the bicycle frame. Such a mechanism would preferably lock the handlebars into each of a riding position and a storing position relative the front wheel, such that the storing position may, in some embodiments, also provide a degree of protection against theft. Furthermore, in some embodiments, it may be desirable to provide a retrofit kit or system for retro-fitting a bicycle with an aforesaid mechanism by simply changing the stem to one with the mechanism as described in the foregoing disclosure.

The presently disclosed technology provides a mechanism, which permits adjusting the position of the handlebars of a bicycle relative to the wheel and the remainder of the bicycle, including the body of the stem, from normal to coplanar. This mechanism secures the handlebars into at least one of a riding position and a storing position, such that the storing position, in some embodiments may also provide a degree of protection against theft. A bicycle may also be retro-fitted with the mechanism, as described herein, without substantial modification to the existing bicycle, simply changing the stem to one with the mechanism as disclosed herein.

In one aspect, there is provided an articulating bicycle stem for reducing the storage footprint of a bicycle. The articulating bicycle stem comprises a stem body having first end including a steering tube connector and a second end including rotatable member receiving region. The steering tube connector is securely couplable to a steering tube of a bicycle fork assembly. A rotatable inner member which is receivable in a complementary-shaped outer casing of the rotatable member receiving region is provided. The rotatable inner member has a handlebar-receiving region located near a distal region thereof for securely coupling handlebars to the rotatable inner member. The rotatable inner member is selectively re-positionable within the outer casing such that the handlebars can be selectively rotated in a horizontal plane between at least a reversibly securable riding position and a reversibly securable storage position.

In at least one preferred embodiment, in the storage position the handlebars are substantially in line with a front wheel of the bicycle.

In at least one preferred embodiment, the outer casing is a tube and the inner rotatable member is complementarily cylindrically shaped.

In some embodiments, the articulating bicycle stem includes a first releasable locking mechanism. The first releasable locking mechanism comprises a bar extending across a bore of the outer casing in a vicinity of a proximal end of the outer casing. At least two channels or at least two pairs of detents are located on a proximal end of the rotatable inner member. The bar is receivable in each of said channels or corresponding pairs of detents. In such an embodiment, a first of channels or first pair of said detents defines a riding position of the handlebars and a second of said channels or second pair of detents defines a storage position of said handlebars. Furthermore, in preferred embodiments, the first and second channels or first and second pair of detents define at a first line and a second line, respectively, and wherein the first and second lines are normal to each other.

In some embodiments there is provided a releasable locking mechanism configured to inhibit coaxial movement of the rotatable inner member relative to the outer casing.

In some embodiments, the handlebar-receiving region comprises: a detachable member which is attachable to the distal region thereby defining the handlebar receiving region for securely receiving therein a portion of the handlebars. In certain embodiments, the detachable member has at least one threaded bore and a curved inner surface and the distal region, similarly, has at least one threaded bore and a curved inner surface. Each of the threaded bores are configured to accept at least one bolt and securely receive a portion of the handlebars in the so defined handlebar receiving region.

In some embodiments, the second releasable locking mechanism comprises a tab pivotally mounted on a support member and an annular ring, where the annular ring is located in a vicinity of a distal end of the rotatable inner member. In operation, the tab rides on a distal side of the annular ring in a locking position. In yet another embodiment, the second releasable locking mechanism comprises a slotted member and an annular groove, where the annular groove is located in a vicinity of a distal end of the rotatable inner member and is configured to be releasably retained the slotted mechanism.

In another aspect of the instant disclosure, there is provided a kit of parts for retrofitting a bicycle. The kit comprises: an articulating bicycle stem having first end including a steering tube connector and a second end including rotatable member receiving region, the steering tube connector is securely couplable to a steering tube of a bicycle fork assembly. A rotatable inner member receivable in a complementary-shaped outer casing of the rotatable member receiving region is also provided, where the rotatable inner member has a handlebar receiving region located near a distal region thereof for securely coupling handlebars to the rotatable inner member. The rotatable inner member is provided as being selectively re-positionable within the outer casing such that the handlebars can be selectively rotated in a horizontal plane between at least a reversibly securable riding position and a reversibly securable storage position. In some embodiments, the kit of parts also includes a set of installation and use instructions.

In some embodiments, the kit further comprises at least one sleeve portion for at least partially lining an interior surface of the handlebar-receiving region so as to shim a portion of the handlebars to be securely received in the handlebar-receiving region.

In some embodiments of the kit of parts, the articulating bicycle stem includes a first releasable locking mechanism which comprises a bar extending across a bore of the outer casing in a vicinity of a proximal end of the outer casing and at least two channels or at least two corresponding pairs of detents located on a proximal end of the rotatable inner member. The bar is receivable in each of the channels or pairs of detents. A first of channels or first pair of the detents defines a riding position of the handlebars and a second of the channels or second pair of detents defines a storage position of said handlebars.

In some embodiments, the kit of parts further comprises a second releasable locking mechanism where the second releasable locking mechanism is configured to inhibit coaxial movement of the rotatable inner member relative to the outer casing.

In some embodiments of the kit of parts, the handlebar-receiving region comprises: a detachable member which is attachable to the distal region thereby defining the handlebar receiving region for securely receiving a portion of the handlebars. In some embodiments the detachable member has at least one threaded bore and the distal region has at least one threaded bore where the threaded bores are each configured to accept at least one bolt and securely receive a portion of the handlebars in the so defined handlebar receiving region. In such embodiments, the kit may also include a bolt-tightening tool.

In yet another aspect of the present disclosure there is provided a method of reducing a footprint of a bicycle wherein the bicycle includes the articulating stem herein. The method comprises:
  (i) selectively releasing the rotatable inner member from secure engagement with said outer casing and reconfiguring such that the rotatable inner member can be rotated from the riding position relative the stem body in a horizontal plane;
  (ii) rotating the rotatable inner member relative the stem body, in a horizontal plane, from the riding position to the storage position;
  (iii) configuring the rotatable inner member in the outer casing such that the handlebars are in the storage position; and
  (iv) selectively securing the rotatable inner member in the outer casing with the handlebars in the storage position.
    In preferred embodiments, in said storage position the handlebars are in line with a front wheel of the bicycle.

In still another aspect, there is provided an articulable bicycle stem system. In such a system, the articulable bicycle stem has a stem body intervening a steering tube connector end region and an opposed rotatable member receiving end region. The steering tube connector end is securely couplable to a steering tube of a bicycle fork assembly and a rotatable member operably is disposed in the opposed rotatable member receiving end region. The rotatable member is configured to be selectively rotatable and to permit releasable locking of a handlebar in each of a riding position and a storing position.

An improved bicycle stem is also provided. The bicycle stem having a handlebar receiver, a stem body and a steering tube connector, wherein the improvement comprises a rotatable member disposed between the stem body and the steering tube connector, the rotatable member configured to permit releasable locking of a handlebar in each of a riding position and a storing position.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

In order that the invention may be better understood, exemplary embodiments will now be described by way of example only, with references to the accompanying drawings, wherein.

DETAILED DESCRIPTION

With reference to the disclosure herein and the appended figures, a device bicycle handlebar stem in accordance with various embodiments of the invention.

Figure 1:
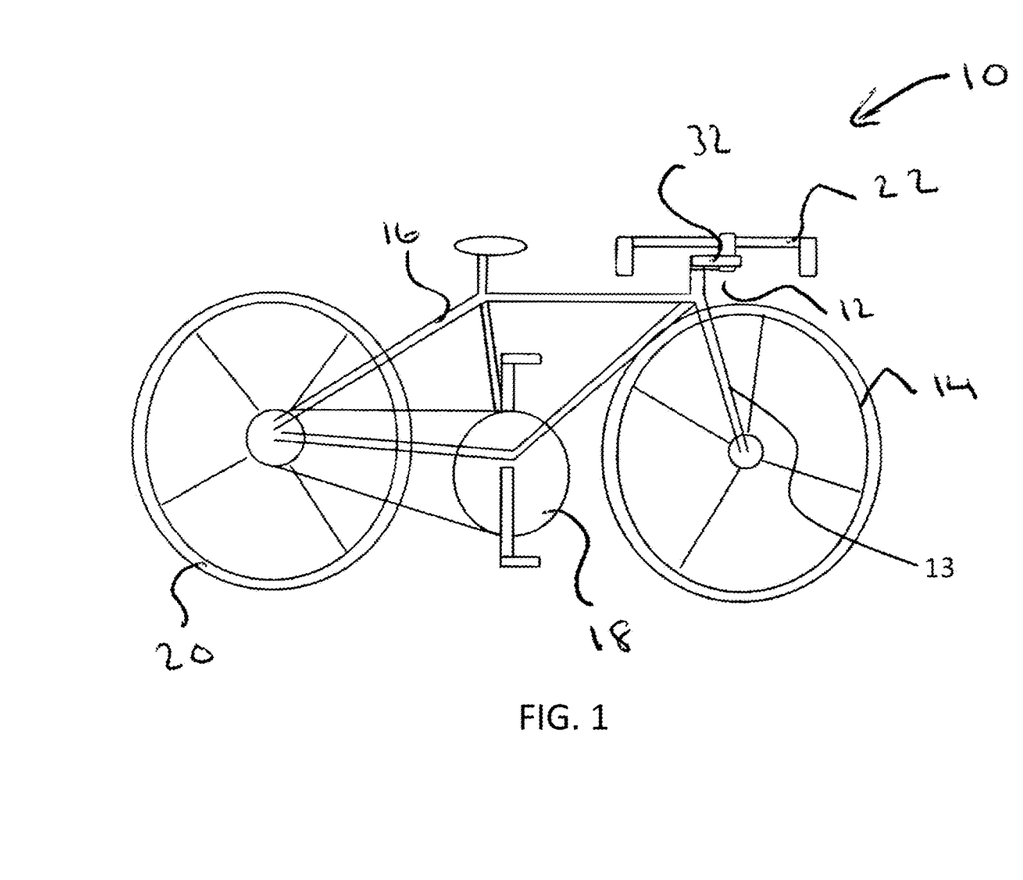
FIG. 1 is a side view of a schematic bicycle showing an exemplary embodiment of a stem of the instant disclosure and the handlebar in a storage position.

With reference to FIG. 1, a bicycle is shown, generally referred to as 10. The bicycle 10 shown has commonly known standard bicycle components, except it is outfitted with an exemplary embodiment of an articulating bicycle stem 12 of the instant disclosure having a stem body 32 for use as component of the steering mechanism. The stem body 32 and is provided as an intermediary between a fork assembly 13, which provides support for the front wheel 14, and the handlebars 22 upon which a user acts to effect pivoting of the front wheel 14 for steering of the bicycle 10. The bicycle 10 is shown in FIG. 1 with the handlebars 22 in the storage position, hence the front wheel 14, the frame 16, the drive train 18, the stem body 32 and the rear wheel 20 are coplanar with the handlebars 22, that being that the handlebars 22 are in line with front wheel 14 and in the same plane.

Figure 2:
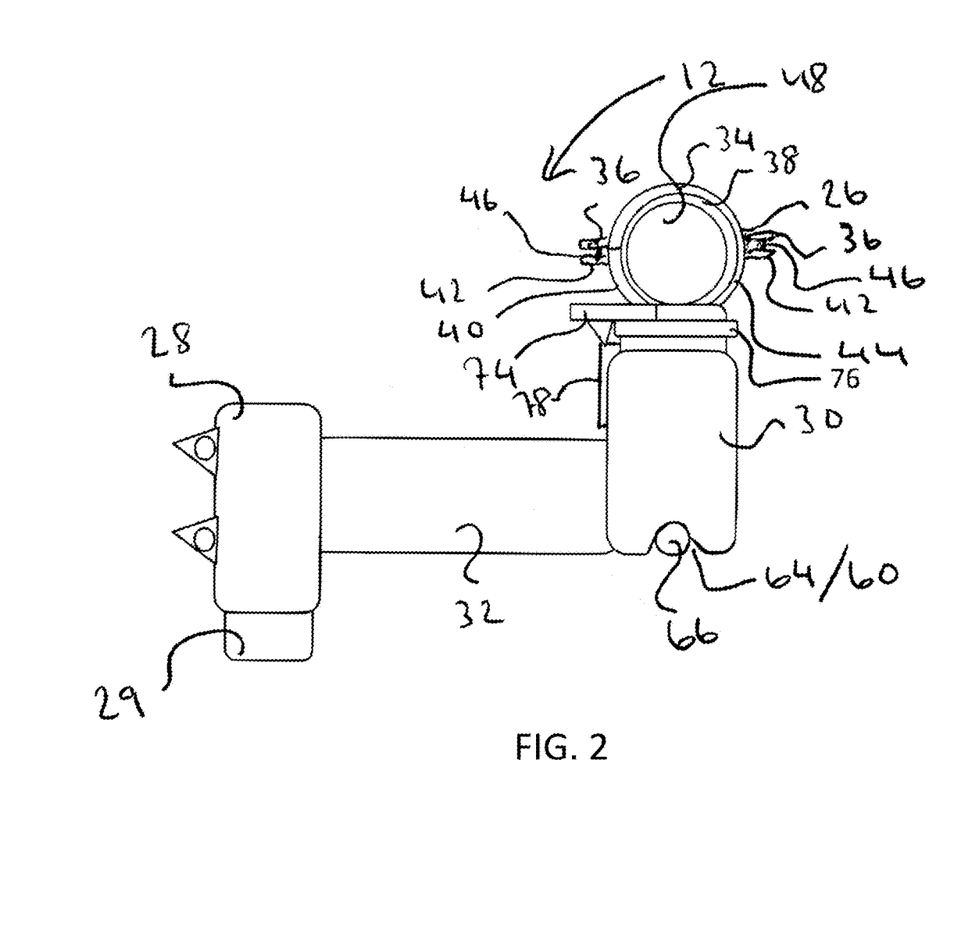
FIG. 2 is a side view of an exemplary embodiment of the stem of the instant disclosure.

As shown in FIG. 2, the bicycle stem 12 has a handlebar or receiver receiving region 26 to be oriented distal of the bicycle frame 16, a steering tube connector 28 connectable to an upper portion or steering tube 29 of the fork assembly 13, a rotatable member receiving region 30 and the stem body 32 therebetween. The handlebar receiving region 26 has a detachable member 34, which for example, in some embodiments has four threaded bores 36 for allowing reversible attachment to complementary bores 42 on a distal region 40. The detachable member 34 has a detachable member curved inner surface 38 and the distal region 40 has a distal region curved inner surface 44 for receiving therethrough the handlebars 22. As noted above, the threaded bores 36 and the complementary bores 42 of the detachable member 34 and the distal member 40 are alignable such that the detachable member 34 and the distal member 40 can be reversibly mated to maintain the handlebars 22 in position. In some embodiments, not shown, the detachable member 34 and the distal member 40 may be permanently joined or fused or forged along one edge and open along the other edge to allow clamping of the handlebars 22 via compression of the open section by some means. For example, in some exemplary embodiments, hex bolts 46 attach the detachable member 34 to the distal region 40, forming a handlebar accepting bore 48 and thus clamping the handlebar 22 in position through the use of the hex bolts being received in the threaded bores and tighten therein.

The rotatable member receiving region 30 is disposed between the handlebar receiver 26 and the stem body 32. The stem body 32 may be variable in length and in angle depending on the desired application. The steering tube connector 28 may be tubular and is of variable length, depending on the desired application, yet is fashioned to complementarily receive (FIG. 2), or in some embodiments be received in (FIG. 3) the steering tube 29 and coupled thereto such that the stem body 32 is maintained in fixed position relative the fork assembly 13.

Figure 3:
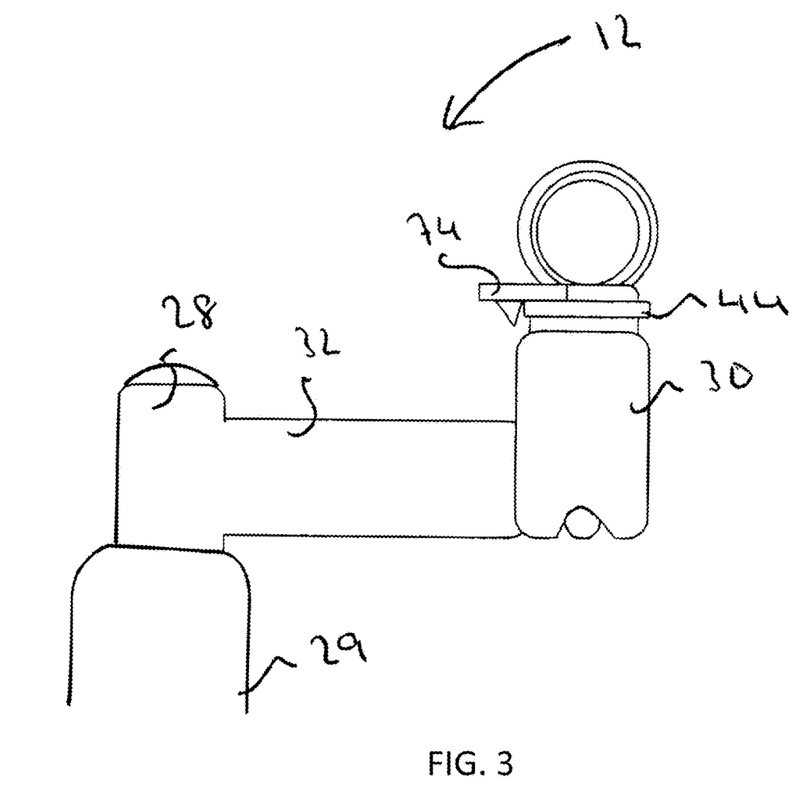
FIG. 3 is a side view of another exemplary embodiment of the stem of the instant disclosure.

As shown in FIG. 3 and noted above, the bicycle stem 12 alternatively is a quill stem, receivable in the steering tube 29 od the fork assembly 13. In such an embodiment, the quill stem is located inside the top of the steering tube 29, hence the steering tube connector 28 is held in place internally.

Figure 4:
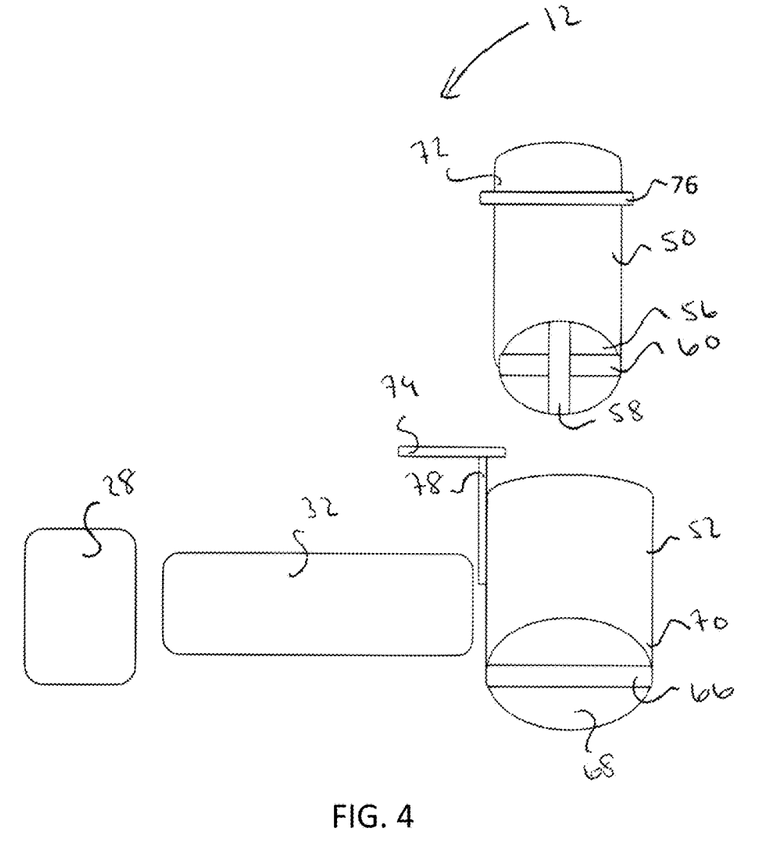
FIG. 4 is an exploded perspective view of the exemplary embodiment of the stem (without the handlebar receiver) of FIG. 2.
Figure 5:
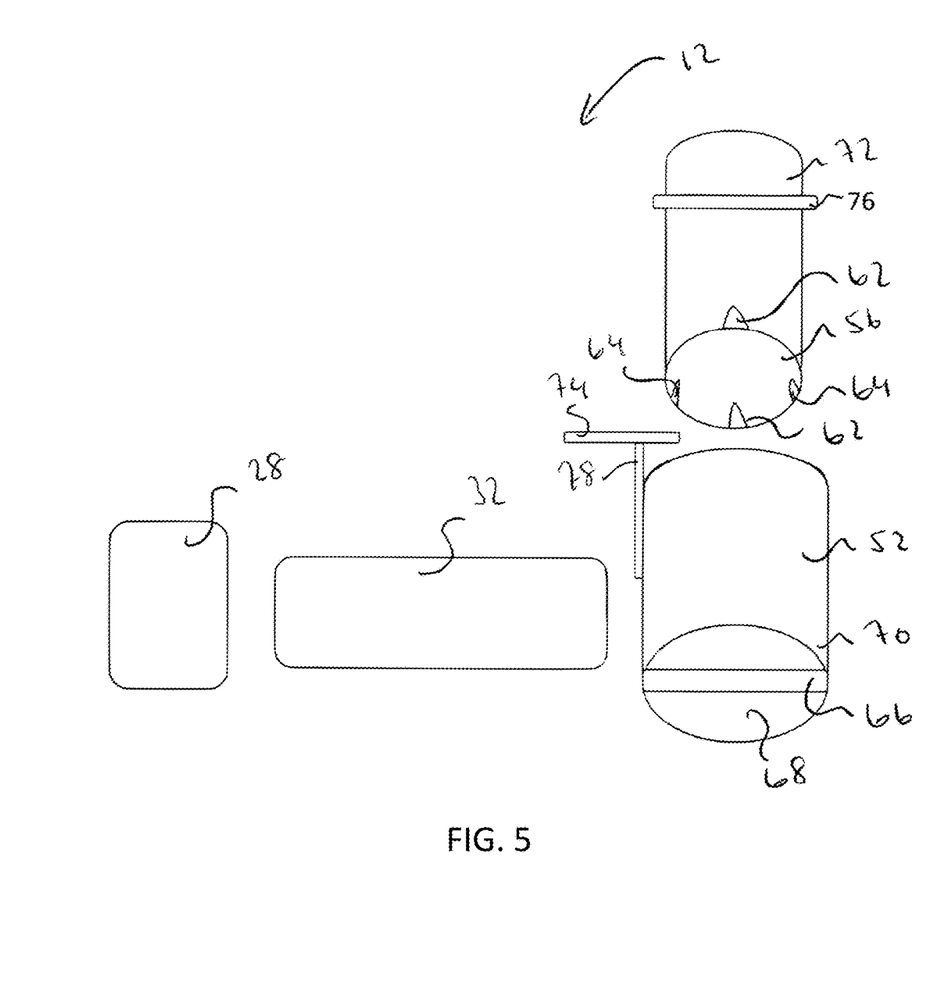
FIG. 5 is an exploded perspective view of another exemplary embodiment of the stem (without the handlebar receiver) of FIG. 2.

Exploded views of the bicycle stem 12 are shown in FIGS. 4 and 5. A rotatable inner member 50, which is cylindrical in some embodiments, such as that of FIG. 4, and is preferably a tube (FIG. 5), is slidably and rotatably housed in an outer tube or casing 52 of the rotatable member receiving region 30. In some embodiments, the rotatable inner member 50 has at least two channels located at a first end 56 thereof. The channels extend across the first end 56 and are, in preferred embodiments, normal to each other. For example, in the embodiment shown in FIG. 3, one channel is a storage channel 58 and the other is a riding channel 60. As shown in the embodiment of FIG. 5, in instances when the rotatable inner member 50 is tubular or hollow, the first end 56 has at least four detents, a corresponding storage pair 62 and a corresponding riding pair 64, wherein the members of each pair oppose one another and a line defined by the storage pair is normal to a line defined by the riding. It should be noted that one of skill in the art will appreciate from the reading of the instant disclosure that more and/or other relative channel or detent angles will be possible, and in some embodiments, be desirable. In the embodiments of FIGS. 4 and 5, the outer tube 52 has a bar 66 extending across its bore 68 in the vicinity of the proximal end 70 of the outer tube 52. In the engaged position, one of the storage channel 58 or the riding channel 60 engage the bar 66, or one of the storage pair 62 or the riding pair 64 engage the bar 66. The channels 58, 60 and detents 62, 64 are preferably U-shaped and the bar is preferably cylindrical, however, other configurations may be possible provided that the contour of the bar is matable with the channel or detents.

Figure 6A:
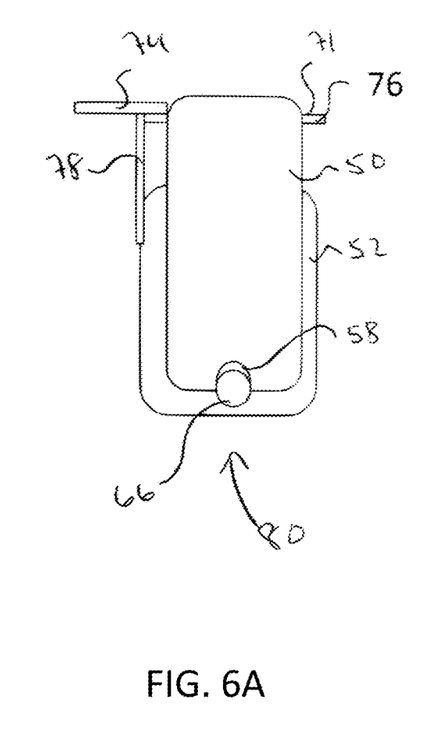
FIG. 6A is a median longitudinal cross-sectional view through the rotatable member of FIGS. 4 and 5 in the locked position.

In some embodiments, the rotatable inner member 50 has an annular ring 76 in the distal region 72 of the rotatable inner member 50. A tab 74 is pivotally disposed on a support member 78, which is attached to the outer tube 52. FIG. 6A, schematically shows the rotatable inner member 50 in the locked position within the outer tube 52, generally referred to as 80. In the illustrated embodiment, the tab 74 fits over the annular ring 76, sitting on a distal side 71 of the annular ring 76 and holding the inner member 50 in the outer tube 52 with the bar 66 received in the channels 58 or detents 62. For example, with reference to FIG. 1, the bicycle 10 is shown with the handlebars 22 located in the storage position wherein the storage channel 58 or the storage detent pair 62 engage the bar 66. The handlebars 22 and the handlebar receiver 26 are coplanar with the remainder of the bicycle 10, including the stem body 32.

Figure 6B:
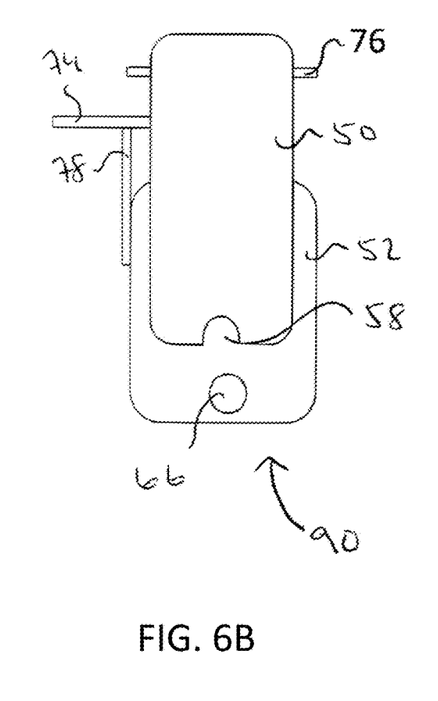
FIG. 6B is a median longitudinal cross-sectional view through the rotatable member of FIGS. 4 and 5 in the unlocked position.

As shown in FIG. 6B, in the unlocked position, generally referred to as 90, the tab 74 has been pivoted away from the annular ring 76, permitting the inner member 50 to be lifted and move coaxially, upwards in the outer tube 52, sufficiently to disengage the bar 66 from the storage channel 58 or the storage detent pair 62. The handlebar receiver 26 and the handlebars 22 can then be rotated from the storage position 80 to the riding position with the inner member 50 being rotated within the outer tube 52 and engaged with the riding channel 60 or riding detent pair 64 (not shown). In the riding position, the rotatable member receiving region 30 is again in the locked position 80. The tab 74 is fitted over the annular ring 76, securing the inner member 50 in the riding position in the outer tube 52. The riding channel 60 or the riding pair 64 engage the bar 66 such that the bicycle 10 is in the riding position and the handlebars 22 are normal to the front wheel 14 and fork assembly 13, the frame 16, the drive train 18, the stem body 32 and the rear wheel 20.

In some embodiments, not shown, the outer casing 52 may have a slit which allows for the rotatable inner member 50 to be reversibly clamped in desired position by compression of the outer casing 52 in the region of the slit. In such embodiments, the outer tube may have a pair of opposed wings located respectively on either side of and parallel to the slit. The wings may have a bore, which may be threaded, therethrough for receiving a threaded or non-threaded rod. In the case of a non-threaded rod, said rod may include a "quick-release" compression mechanism which can be actuated to compress the outer casing 52 in the region of the slit to maintain the rotatable inner member 50 in a desired position. Similarly, in embodiments with the a threaded bore and complementary threaded rod, the rotation of the threaded rod will cause compression of the outer casing 52 in the region of the slit to maintain the rotatable inner member 50 in a desired position. In such embodiments, a multitude of user-defined handlebar 22 angles relative the stem body 12 may be provided.

In still further embodiments, not shown, the rotatable inner member 50 may be provided with a plurilateral perimeter shape, such as, for example, a triangle or a square perimeter shape and the outer casing 52 being similarly complementarily shaped. Clamping and handlebar 22 position securing mechanisms, such as, but not limited to those, presented above may also be provided to reversibly secure the rotatable inner member 50 in the outer casing 52, in such embodiments. In the use of these embodiments, it is envisioned that a user would unclamp the outer tube from the riding position such that the inner rotatable member 50 could be slidably removed therefrom, rotated by a user to a pre-defined angle relative the fork assembly 13, and reinserted and secured into the outer casing 52 into a storage position, or vice versa.

Figure 7:
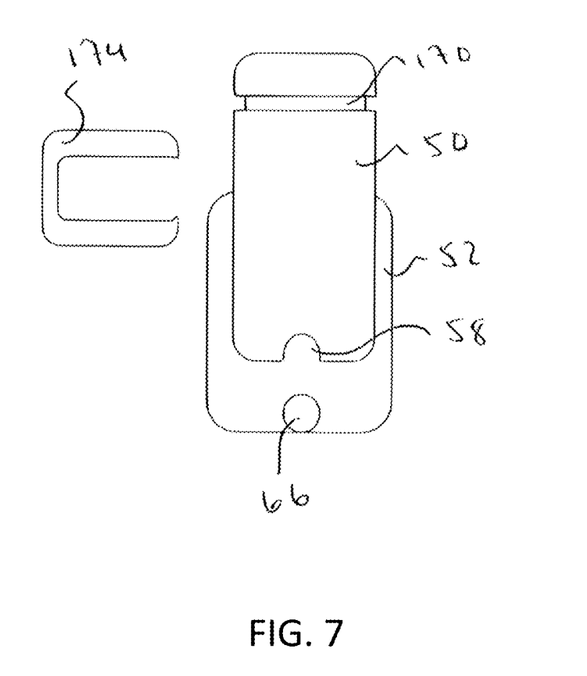
FIG. 7 is a side view of an alternative exemplary embodiment of the inner member and a top view of the slotted member.

In an alternative embodiment, shown in FIG. 7, the annular ring 70 is replaced with an annular groove 170 and the tab 74 and support member 76 are replaced with a slotted member 174. The annular groove 170 is sized to engage the slot 176 of the slotted member 174. Removal of the slotted member 174 from the annular groove 170 releases the inner member 50 from the outer tube 52, again permitting coaxial movement and then rotation of the inner member 50 in the outer tube 52, which in turn allows the handlebars to be moved between the riding position and the storage position.

The handlebar receiver 26 has a detachable member 34, which for example, in some embodiments has four threaded bores 36 for allowing reversible attachment to complementary bores 42 on a distal region 40. The detachable member 34 has a detachable member curved inner surface 38 and the distal region 40 has a distal region curved inner surface 44 for receiving therethrough the handlebars 22. As noted above, the threaded bores 36 and the complementary bores 42 of the detachable member 34 and the distal member 40 are alignable such the detachable member 34 and the distal member 40 can be reversibly mated to maintain the handlebars 22 in position. In some embodiments, not shown, the detachable member 34 and the distal member 40 may be permanently joined or fused along one edge and open along the other edge to allow clamping of the handlebars 22 via compression of the open section. For example, in some exemplary embodiments, hex bolts 46 attach the detachable member 34 to the distal region 40, forming a handlebar accepting bore 48 and thus clamping the handlebar 22 in position through the use of the hex bolts being received in the threaded bores and tighten therein. The rotatable member receiving region 30 is disposed between the handlebar receiver 26 and the stem body 32. The stem body 32 may be variable in length and in angle depending on the desired application. The steering tube connector 28 may be tubular and is of variable length, depending on the desired application, yet is fashioned to complementarily receive (FIG. 2), or in some embodiments be received in (FIG. 3) the steering tube 29 and coupled thereto such that the stem body 32 is maintained in fixed position relative the fork assembly 13.

In some embodiments an articulating bicycle stem 12 may be provided as base component for a kit or kit of parts, or in some instances a retrofit kit provided for existing bicycles 10. Such a kit, for example, may include the articulating bicycle stem 12 having a handlebar receiver portion 26, a steering tube connector portion 28 being connectable to an upper portion or steering tube 29 of a fork assembly 13 of an exiting bicycle, a rotatable member receiving region 30 and the stem body 32 provided therebetween. As described above, exemplary articulating bicycle stems 12 are disclosed suitable for use in a kit or retrofit kit of parts. The kits may be fashioned, for example, to work with existing handlebars 22 and fork assemblies 13 and such may be provided with means to limit the dimensions of the handlebar receiver portion 26 for various handlebar dimensions. For example, although not shown, a plurality of different sized sleeves or sleeve portions may be provided with said kit or retrofit kit for lining or shimming the inner surface 38 and accommodate various handlebar dimensions of existing handlebars. Alternatively, in some embodiments, various handlebar receiver portions 26 may be provided different diameters. Similarly, steering tube connector portions 28 may be provided with one or more sleeves or portions thereof to accommodate various sizes of the upper portion or steering tube 29 of existing bicycles 10. Alternatively, various diameters of steering tube connector portions 28 may be made and provided in one or more kits for use in quill-type/stem tube connector systems. Furthermore, in some embodiments, a set of instructions for installing and using the articulating bicycles may be included in the kit of parts.

All methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments and is not intended to pose a limitation on the scope of the claimed invention unless otherwise claimed.

Additionally, by way of the instantly disclosed articulating bicycle stem a method of reducing a footprint of a bicycle 10 is provided where the bicycle 10 includes the articulating stem 12 hereinabove described. The method comprises:
  (i) selectively releasing the rotatable inner member 50 from secure engagement with said outer casing 52 and reconfiguring such that the rotatable inner member 50 can be rotated from the riding position relative the stem body 32 in a horizontal plane;
  (ii) rotating the rotatable inner member 50 relative the stem body 32, in a horizontal plane, from the riding position to the storage position, as shown in FIG. 1;
  (iii) configuring the rotatable inner member 50 in the outer casing 52 such that the handlebars 22 are in the storage position; and
  (iv) selectively securing the rotatable inner member 50 in the outer casing 52 with the handlebars 22 in the storage position.

The storage position of certain preferred embodiments with the handlebars 22 in line, or substantially in line, with a front wheel 14 of the bicycle 10 is shown in FIG. 1.

Advantages of the exemplary embodiments described herein may be realized and attained by means of the instrumentalities and combinations particularly pointed out in this written description. It is to be understood that the foregoing general description and detailed description are exemplary and explanatory only and are not restrictive upon any embodiment in particular. While example embodiments have been described in detail, the foregoing description is in all aspects illustrative and not restrictive. It is understood that numerous other modifications and variations can be devised without departing from the scope of the exemplary embodiments disclosed herein. For example, in alternative embodiments, a wide range of locking mechanisms could be used for securing the handlebars 22 in the storage position or the riding position and such mechanisms for providing a clamping or securing force may be apparent to those of skill in the art from a reading of the instant disclosure. The device is described for what are currently the preferred embodiments.

It is to be understood that the above description it is intended to be illustrative, and not restrictive. Many other embodiments will be apparent to those skilled in the art, upon reviewing the above description. The scope of the invention should, therefore, be determined with reference to the appended claims, along with the full scope of equivalents to which such claims are entitled.

Although the present invention has been described with reference to specific exemplary embodiments, it will be evident that various modifications and changes may be made to these embodiments without departing from the broader spirit and scope of the disclosed subject matter as defined by the appended claims.

What is claimed is:

1. An articulating bicycle stem for a bicycle comprising:
  a stem body having a first end including a steering tube connector and a second end including a rotatable member receiving region, the steering tube connector being securely couplable to a steering tube of a bicycle fork assembly; and
  a rotatable inner member receivable in a complementary-shaped cylindrical outer casing of said rotatable member receiving region;
  said rotatable inner member having a handlebar-receiving region located near a distal region thereof for securely coupling handlebars to said rotatable inner member;
  said rotatable inner member being selectively re-positionable within said outer casing such that said handlebars can be rotated in a horizontal plane between at least a reversibly securable riding position and a reversibly securable storage position without first vertically separating contact of said rotatable inner member from said cylindrical outer casing to effect said rotation.

2. The articulating bicycle stem as defined in claim 1, wherein in said storage position the handlebars are substantially in line with a front wheel of the bicycle.

3. The articulating bicycle stem as defined in claim 1, including a first releasable locking mechanism comprising:
  a bar extending across a bore of the outer casing in a vicinity of a proximal end of the outer casing; and
  at least two channels or at least two pairs of detents located on a proximal end of the rotatable inner member, said bar being receivable in each of said channels or said pairs of detents;
  wherein a first of said channels or first of said pairs of detents defines a riding position of the handlebars and a second of said channels or second of said pairs of detents defines the storage position of said handlebars.

4. The articulating bicycle stem as defined in claim 3, wherein the first and second channels or first and second pair of detents define a first line and a second line, respectively, the first and second lines being normal to each other.

5. The articulating bicycle stem as defined in claim 3, further comprising a second releasable locking mechanism, the second releasable locking mechanism configured to inhibit coaxial sliding movement of the rotatable inner member relative to the outer casing.

6. The articulating bicycle stem as defined in claim 5, wherein the second releasable locking mechanism comprises:
  a tab pivotally mounted on a support member; and
  an annular ring located in a vicinity of a distal end of the rotatable inner member;
  wherein the tab rides on a distal side of the annular ring when the second releasable locking mechanism is in a locked position.

7. The articulating bicycle stem as defined in claim 5, wherein:
  the second releasable locking mechanism comprises a slotted member and an annular groove;
  the annular groove is located in a vicinity of a distal end of the rotatable inner member, and configured to releasably retain the slotted member.

8. The articulating bicycle stem as defined in claim 1, further comprising a releasable locking mechanism, the releasable locking mechanism configured to inhibit coaxial sliding movement of the rotatable inner member relative to the outer casing.

9. The articulating bicycle stem as defined in claim 1, wherein the handlebar-receiving region comprises a detachable member, said detachable member being attachable to the distal region thereby defining the handlebar-receiving region for securely receiving therein a portion of the handlebars.

10. The articulating bicycle stem as defined in claim 9, wherein:
the detachable member has at least one bore and a curved inner surface;
the distal region has at least one threaded bore and a curved inner surface; and
the threaded bores are each configured to accept a bolt to secure a portion of the handlebars in the handlebar-receiving region.

11. The articulating bicycle stem as defined in claim 1, further comprising:
a first releasable locking mechanism comprising:
a bar extending across a bore of the outer casing in a vicinity of a proximal end of the outer casing; and
at least two channels or at least two pairs of detents located on a proximal end of the rotatable inner member, said bar being receivable in each of said channels or pairs of detents; and
a second releasable locking mechanism, the second releasable locking mechanism configured to inhibit coaxial sliding movement of the rotatable inner member relative to the outer casing;
wherein the first and second channels or first and second pair of detents define a first line and a second line, respectively, the first and second lines being normal to each other;
wherein the first line defines the riding position of the handlebars and the second line defines the storage position of the handlebars.

12. The articulating bicycle stem as defined in claim 1, further comprising:
a first releasable locking mechanism comprising:
a bar extending across a bore of the outer casing in a vicinity of a proximal end of the outer casing; and
at least two channels or at least two pairs of detents located on a proximal end of the rotatable inner member, said bar being receivable in each of said channels or pairs of detents; and
a second releasable locking mechanism, the second releasable locking mechanism configured to inhibit coaxial sliding movement of the rotatable inner member relative to the outer casing;
wherein a first of said channels or first of said pairs detents defines a riding position of the handlebars and a second of said channels or second of said pairs of detents defines the storage position of said handlebars;
wherein in said storage position the handlebars are substantially in line with a front wheel of the bicycle.

13. A kit of parts for retrofitting a bicycle, the kit comprising:
an articulating bicycle stem having a first end including a steering tube connector and a second end including a rotatable member receiving region, the steering tube connector being securely couplable to a steering tube of a bicycle fork assembly;
a rotatable inner member receivable in a complementary-shaped cylindrical outer casing of said rotatable member receiving region;
said rotatable inner member having a handlebar-receiving region located near a distal region thereof for securely coupling handlebars to said rotatable inner member;
said rotatable inner member being selectively re-positionable within said outer casing such that said handlebars can be rotated in a horizontal plane between at least a reversibly securable riding position and a reversibly securable storage position without first vertically separating contact of said rotatable inner member from said cylindrical outer casing to effect said rotation.

14. The kit of parts as defined in claim 13, further comprising a set of installation and use instructions.

15. The kit of parts as defined in claim 13, further comprising at least one sleeve portion for at least partially lining an interior surface of the handlebar-receiving region so as to shim a portion of the handlebars to be securely received in the handlebar-receiving region.

16. The kit of parts as defined in claim 13, wherein the articulating bicycle stem includes a first releasable locking mechanism comprising:
a bar extending across a bore of the outer casing in a vicinity of a proximal end of the outer casing; and
at least two channels or at least two corresponding pairs of detents located on a proximal end of the rotatable inner member, said bar being receivable in each of said channels or pairs of detents;
wherein a first of said channels or first of said pairs of detents defines a riding position of the handlebars and a second of said channels or second of said pairs of detents defines a storage position of said handlebars.

17. The kit of parts as defined in claim 16, further comprising a second releasable locking mechanism, the second releasable locking mechanism configured to inhibit coaxial sliding movement of the rotatable inner member relative to the outer casing.

18. The kit of parts as defined in claim 13, further comprising a releasable locking mechanism, the releasable locking mechanism configured to inhibit coaxial sliding movement of the rotatable inner member relative to the outer casing.

19. The kit of parts as defined in claim 13, further comprising:
a detachable member, said detachable member being attachable to the distal region thereby defining the handlebar-receiving region for securely receiving a portion of the handlebars, wherein the detachable member has at least one bore and the distal region has at least one threaded bore, the threaded bores each configured to accept at least one bolt and securely receive a portion of the handlebars in the so defined handlebar-receiving region; and
a bolt tightening tool.

20. The kit of parts as defined in claim 13, further comprising:
at least one sleeve portion for at least partially lining an interior surface of the handlebar-receiving region so as to shim a portion of the handlebars to be securely received in the handlebar-receiving region;
a first releasable locking mechanism in the articulating bicycle stem comprising:
a bar extending across a bore of the outer casing in a vicinity of a proximal end of the outer casing; and
at least two channels or at least two corresponding pairs of detents located on a proximal end of the rotatable inner member, said bar being receivable in each of said channels or pairs of detents;
wherein a first of said channels or first of said pairs of detents defines a riding position of the handlebars and a second of said channels or second of said pairs of detents defines a storage position of said handlebars;
a second releasable locking mechanism in the articulating bicycle stem, the second releasable locking mechanism configured to inhibit coaxial sliding movement of the rotatable inner member relative to the outer casing;

a detachable member in the handlebar-receiving region, said detachable member being attachable to the distal region thereby defining the handlebar-receiving region for securely receiving a portion of the handlebars, wherein the detachable member has at least one bore and the distal region has at least one threaded bore, the threaded bores each configured to accept at least one bolt and securely receive a portion of the handlebars in the so defined handlebar-receiving region; and a bolt tightening tool.

21. A method of reducing a footprint of a bicycle, wherein the bicycle includes an articulating stem comprising:

a stem body having a first end including a steering tube connector and a second end including a rotatable member receiving region, the steering tube connector being securely couplable to a steering tube of a bicycle fork assembly; and a rotatable inner member receivable in a complementary-shaped cylindrical outer casing of said rotatable member receiving region;

said rotatable inner member having a handlebar-receiving region located near a distal region thereof for securely coupling handlebars to said rotatable inner member;

said rotatable inner member being selectively re-positionable within said outer casing such that said handlebars can be rotated in a horizontal plane between at least a reversibly securable riding position and a reversibly securable storage position without first vertically separating contact of said rotatable inner member from said cylindrical outer casing to effect said rotation;

the method comprising:

(i) releasing the rotatable inner member from secure engagement with said outer casing;

(ii) sliding the rotatable inner member coaxially with the outer casing, so that it can be rotated within the outer casing from the riding position relative to the stem body in a horizontal plane without first vertically separating contact of the rotatable inner member from the outer casing to effect said rotation;

(iii) rotating the rotatable inner member relative to the stem body, in a horizontal plane, from the riding position to the storage position;

(iv) configuring the rotatable inner member in the outer casing such that the handlebars are in the storage position; and (v) securing the rotatable inner member in the outer casing with the handlebars in the storage position.

22. The method as defined in claim 21, wherein in said storage position the handlebars are substantially in line with a front wheel of the bicycle.

* * * * *